(12) United States Patent
Liu et al.

(10) Patent No.: US 11,518,044 B2
(45) Date of Patent: Dec. 6, 2022

(54) END EFFECTOR, ROBOT AND PACKAGE SORTING SYSTEM

(71) Applicant: Shenzhen Dorabot Inc., Shenzhen (CN)

(72) Inventors: Qi Yang Liu, Shenzhen (CN); Yao Li, Shenzhen (CN); Yi Xu, Shenzhen (CN)

(*) Notice: Subject to any disclaimer, the term of this patent is extended or adjusted under 35 U.S.C. 154(b) by 387 days.

(21) Appl. No.: 16/696,342

(22) Filed: Nov. 26, 2019

(65) Prior Publication Data

US 2021/0031379 A1 Feb. 4, 2021

(30) Foreign Application Priority Data

Jul. 29, 2019 (CN) .......................... 201921204859.9

(51) Int. Cl.
| | |
|---|---|
| *B25J 15/00* | (2006.01) |
| *B25J 19/02* | (2006.01) |
| *B65G 43/00* | (2006.01) |
| *B65G 21/12* | (2006.01) |
| *B07C 3/08* | (2006.01) |

(52) U.S. Cl.
CPC ........... *B25J 15/0019* (2013.01); *B07C 3/082* (2013.01); *B25J 19/02* (2013.01); *B65G 21/12* (2013.01); *B65G 2203/042* (2013.01)

(58) Field of Classification Search
CPC ..... B07C 2501/0063; B07C 3/02; B07C 3/08; B07C 3/082; B25J 11/00; B25J 13/088; B25J 15/0014; B25J 15/0019; B25J 15/004; B25J 19/02; B60J 5/00; B64D 9/003; B65G 1/0435; B65G 21/12; B65G 2203/04; B65G 17/345; E06B 11/025; B65D 88/546
USPC .......................................... 198/346.3, 341.01
See application file for complete search history.

(56) References Cited

U.S. PATENT DOCUMENTS

| | | | | |
|---|---|---|---|---|
| 3,390,808 | A * | 7/1968 | Rehrig ..................... | B65D 1/42 220/643 |
| 6,588,574 | B2 * | 7/2003 | Koini ....................... | B25J 15/00 198/341.01 |
| 2020/0238534 | A1 * | 7/2020 | Goldberg ............... | B25J 9/0093 |
| 2020/0269283 | A1 * | 8/2020 | Ulrich ...................... | B07C 3/08 |

FOREIGN PATENT DOCUMENTS

BR 102014033144 A2 * 4/2017 ............ E06B 11/025

* cited by examiner

*Primary Examiner* — Paul T Chin

(57) ABSTRACT

The invention provides an end effector, comprising a mounting portion and an execution portion, and the execution portion including at least a package placement platform configured to movably coupled to the mounting portion. With the help of the package placement platform, the end effector of the invention can receive the packages of different types or different sizes or different material so as to sort and transport all kinds of packages.

16 Claims, 5 Drawing Sheets

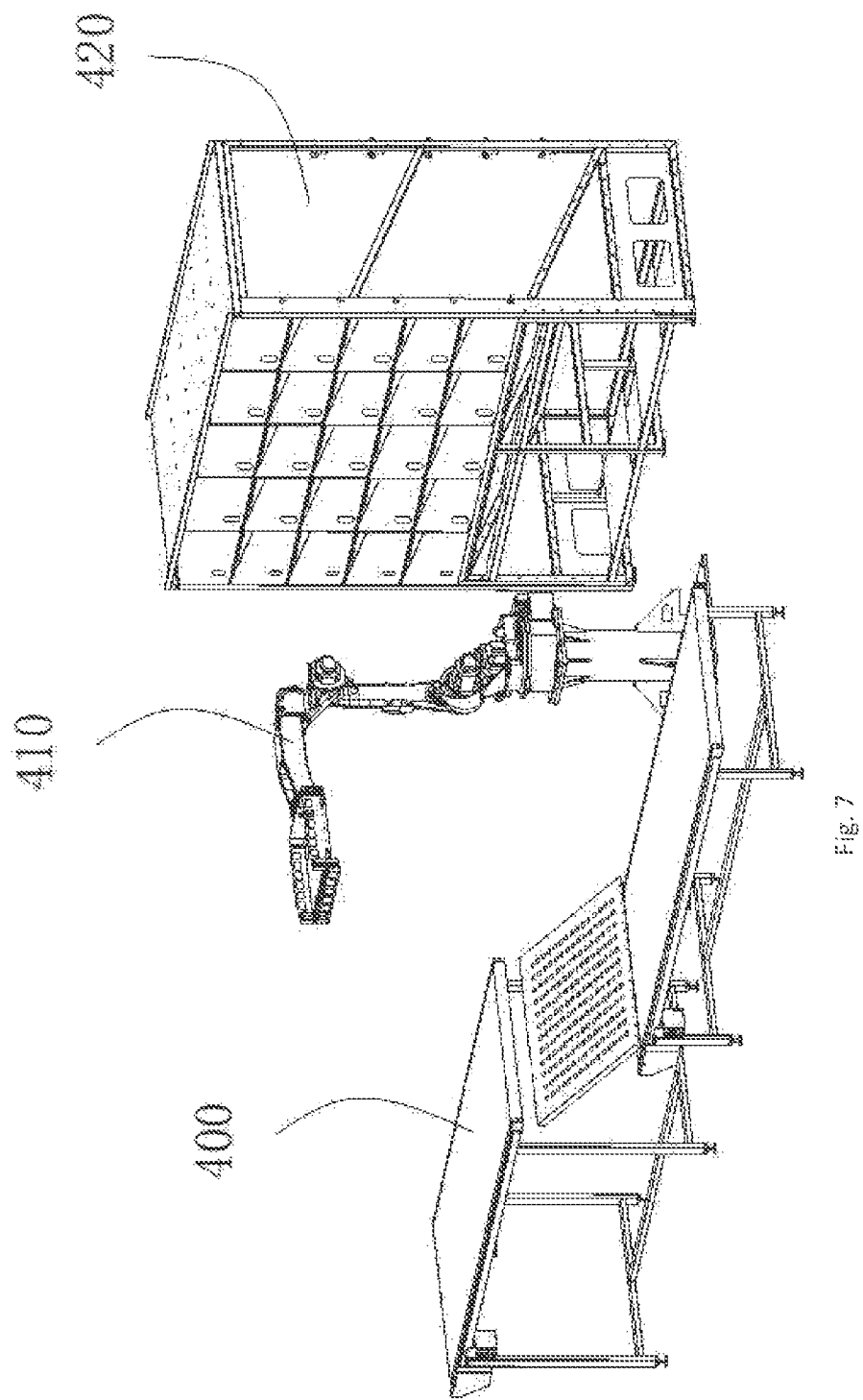

END EFFECTOR, ROBOT AND PACKAGE SORTING SYSTEM

RELATED APPLICATION

This application claims priority to China Patent Application No. CN 201921204859.9, filed on Jul. 29, 2019, and entitled "END EFFECTOR, ROBOT AND PACKAGE SORTING SYSTEM", which is incorporated herein by reference in its entirety.

FIELD OF THE INVENTION

The invention relates generally to the field of robotics, and in particular to an end effector, a robot and a package sorting system.

BACKGROUND OF THE INVENTION

In the automation of the logistics industry, industrial robots can perform the sorting of goods. The end of the robot arm of the industrial robot is equipped with an end effector which is configured to perform the pick-up and placing operation of the goods. Existing end effectors have various structures such as suction cups, claws, dexterous hands, and other special structures for specific items.

However, in the process of package sorting, it is found that the diversity of package categories is inevitable for the cargo sorting system, while the end effector of existing robots can just only grasp a cargo of certain type or specific size or specific material.

SUMMARY OF THE INVENTION

The purpose of this invention is to provide with an end effector, a robot and a package sorting system, which can undertake various types of goods, and then transport and sort various types of the goods.

In accordance with an aspect of the invention, an end effector, comprising a mounting portion and an execution portion, and the execution portion includes: at least a package placement platform configured to movably coupled to the mounting portion.

By adopting the above technical solutions, with the help of the package placement platform, the end effector of the invention can receive the packages of different types or different sizes or different material so as to sort and transport all kinds of packages.

In accordance with another aspect of the invention, a robot, comprising: a base, a robot arm assembly, and an end effector arranged on the rear end of the robot arm assembly, and the end effector comprising a mounting portion and an execution portion, and the execution portion including at least a package placement platform configured to movably coupled to the mounting portion.

By adopting the above technical solutions, because of the package placement platform configured as a conveying platform that is connected with the mounting portion by a transmission mechanism, the robot of the invention can receive the packages of different types or different sizes or different material so as to sort and transport all kinds of packages.

In accordance with another aspect of the invention, a package sorting system, comprising: a package delivery platform, a package sorting device and a package storage device, the package sorting device is configured as the robot as described above.

By adopting the above technical solutions, because of the end effector of the robot configured as a conveying platform that is connected with the mounting portion by a transmission mechanism, the package sorting system of the invention can receive the packages of different types or different sizes or different material so as to sort and transport all kinds of packages.

BRIEF DESCRIPTION OF THE DRAWINGS

The embodiments described below with reference to the drawings are intended to explain the present invention and not to limit the scope of the present invention.

FIG. 7 is a schematic three-dimensional view of the package sorting system according to one embodiment of the present invention.

DETAILED DESCRIPTION OF THE INVENTION

Figure 1:
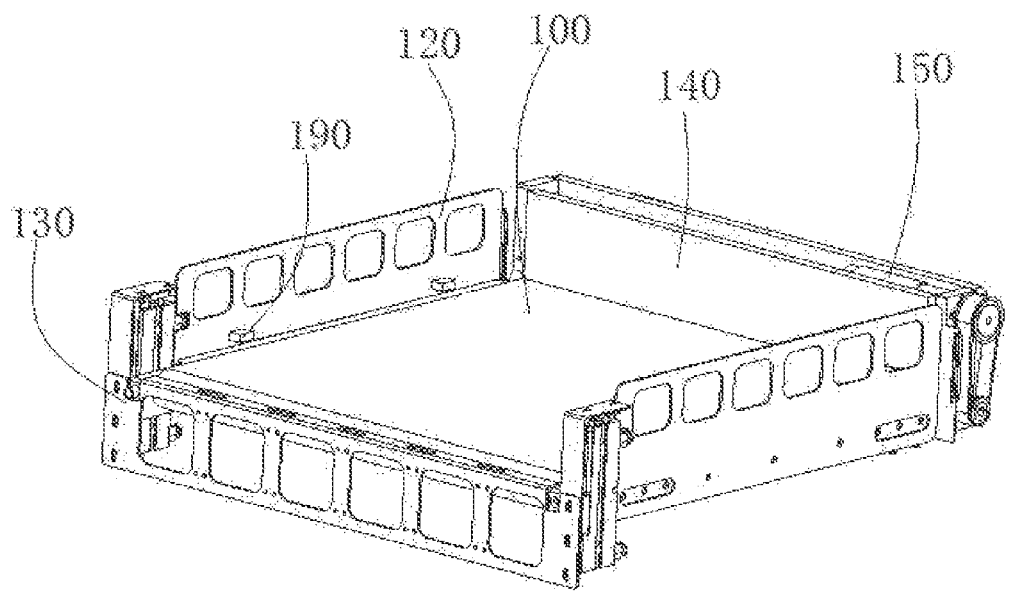
FIG. 1 is one schematic three-dimensional view of the end effector according to the first embodiment of the present invention.

In order to make the purpose, technical solutions and advantages of the implementations of the present invention much clearer, the technical solution of the present invention will be described in more detail below with reference to the accompanying drawings.

It should be noted that in the drawings, the same or similar reference numerals are used to refer to the same or similar elements or elements having the same or similar functions. The described implementations are part of the implementations of the invention and not all of the implementations. In the case of no conflict, the implementations of the present invention and the features in the implementations may be combined with each other. It will be apparent to those skilled in the art that other implementations may be obtained in accordance with the structures illustrated in the implementations of the invention without departing from the scope of the invention.

Referring to FIG. 1 to FIG. 5 at the same time, a first embodiment of an end effector provided by the present invention will be described in detail below. This embodiment is mainly applied to the scenario that the end effector can obtain all kinds of packages, especially the soft packages and the plastic packages which are difficult to be grabbed by the robot.

Figure 2:
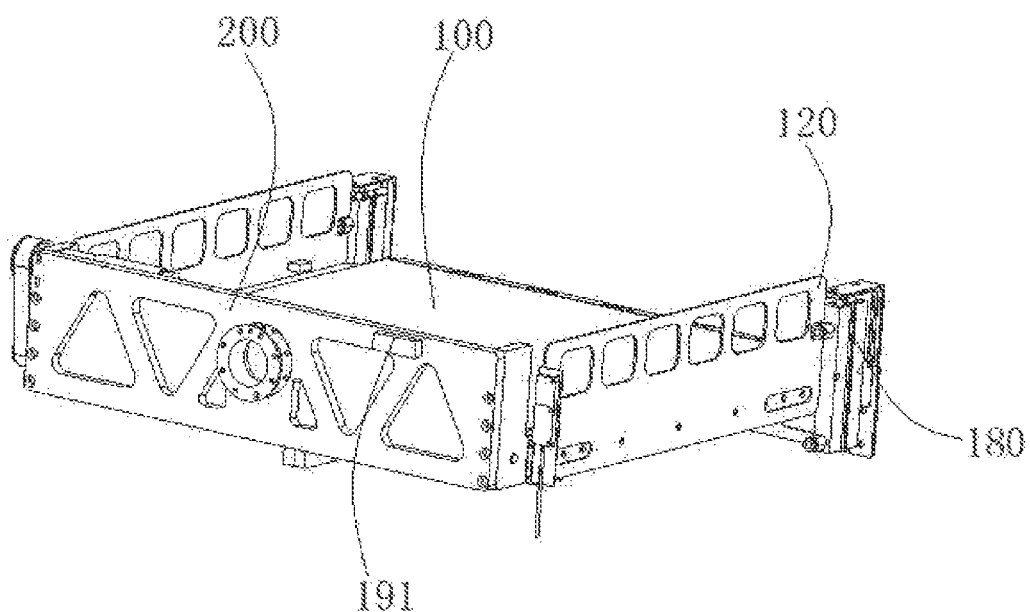
FIG. 2 is another schematic three-dimensional view of the FIG. 1.

Referring to FIG. 1 and FIG. 2, an end effector provided by the first embodiment comprises a mounting portion and an execution portion, and the execution portion includes at least a package placement platform 100 configured to movably coupled to the mounting portion. The package placement platform 100 is configured to receive a package of different types or different sizes or different material rather than one kind of end effector just grabbing a package of a specific shape or a specific size correspondingly.

In some implementations, the package placement platform 100 is configured to be a horizontally arranged plate-like structure.

When working, the end effector moves the package placement platform 100 to a package receiving position so that the front end of the package placement platform 100 is arranged downstream of a external conveying mechanism in a transport direction for taking-over the package from the external conveying mechanism. After the package placement platform 100 has received the package, the end effector moves the package placement platform 100 to the corresponding destination to complete sorting and storage of the package.

In some implementations, a baffle plate 120 is arranged on at least one side of the package placement platform 100 to avoid the package falling off the package placement platform 100 during the transportation.

More specific, the baffle plate 120 may be disposed on each side of the longitudinal direction of the package placement platform 100. The baffle plate 120 is configured to be a plate-like structure. The length of the baffle plate 120 can be set to be equivalent to the length of the package placement platform 100.

In some implementations, in order to reduce the weight of the end effector while observing the condition of the package, part or all of the baffle plate 120 is configured to be a hollow structure, and the hollow structure can be various shapes such as a rectangle, a circle or an ellipse.

In some implementations, the package placement platform 100 is configured as a conveying platform, which is connected with the mounting portion by a transmission mechanism, for facilitating the adjustment of the position of the package on the package placement platform 100. After the conveying platform has received the package, the conveying platform transports the package from the front end of the package placement platform 100 to the rear end of the package placement platform 100, which avoids the package falling off the receiving position during the transportation. And meanwhile when the package is sorted to the corresponding destination, the conveying platform provides a driving force to place the package at the destination bin.

Figure 3:
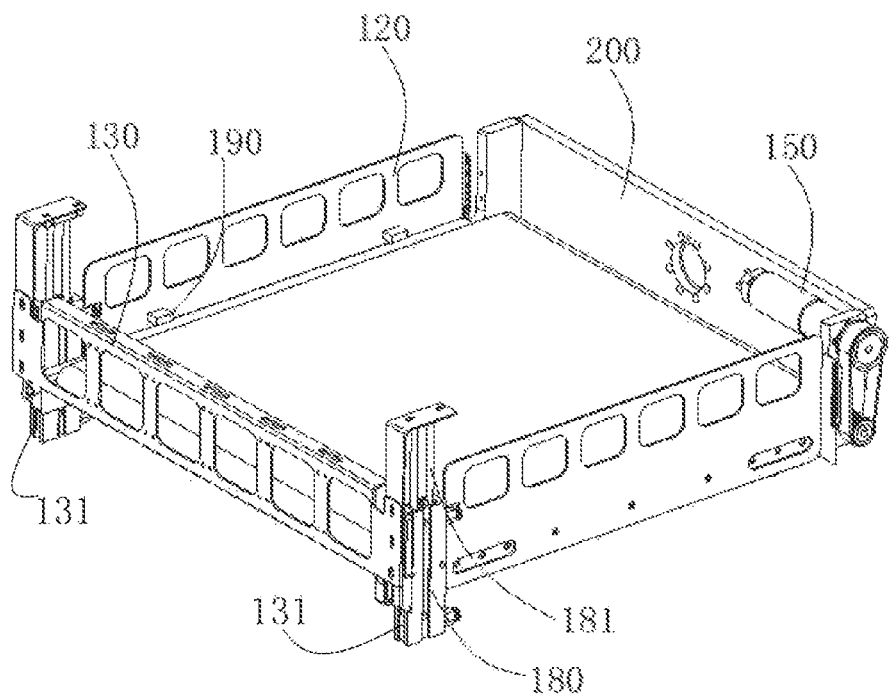
FIG. 3 a schematic three-dimensional view of end effector when the movable baffle plat sliding up to close exit of the end effector.

Referring to FIG. 3, in some implementations, in order to prevent the packages from falling off the conveying platform, and make it convenient to pick up and place the packages, a movable baffle 130 is arranged on the front side of the conveying platform.

More specific, the movable baffle 130 can be a plate-like structure and the movable baffle 130 is slidably coupled to the front side of the package placement platform 100. When the end effector is ready for receiving the package, the front end of the conveying platform is arranged downstream of the external conveying mechanism in a transport direction for taking-over the package from the external conveying mechanism, resulting in the front end of the conveying platform adjacent to the exit of the external conveying mechanism, and the upper surface of the conveying platform is slightly lower than that of the external conveying mechanism; and then the movable baffle 130 slides down below the conveying platform to open the front exit of the end effector. After the conveying platform receives the package, the movable baffle 130 slides up to close the front exit of the conveying platform.

In some implementations, the conveying platform further includes a fixed baffle 140 arranged at the rear end of conveying platform to avoid the package falling off the conveying platform. The fixed baffle 140 can be a plate-like structure and is disposed on the front side of the mounting portion 200. There may also be space between the fixed baffle 140 and the mounting portion 200 to install components such as driving motors or/and sensor assembly as needed.

Figure 4:
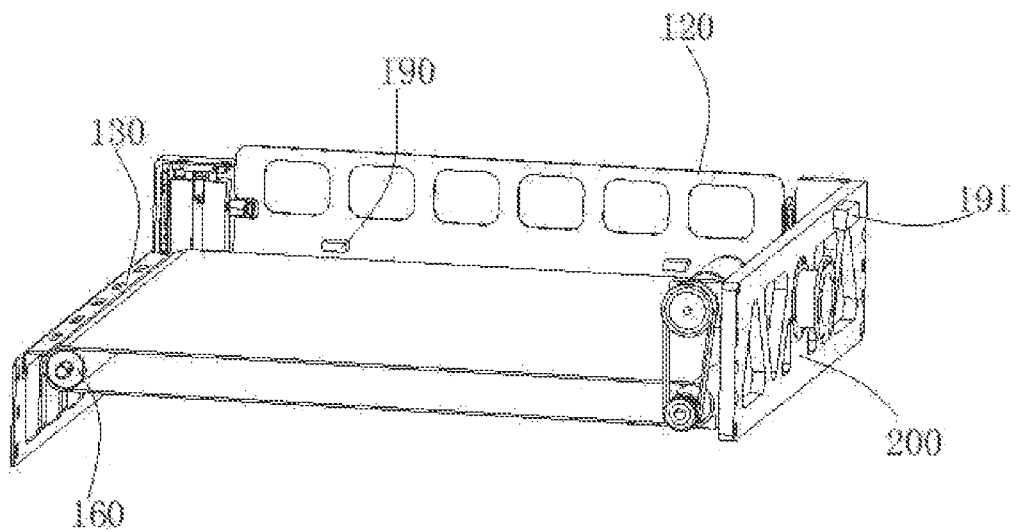
FIG. 4 a schematic three-dimensional sectional view of the conveying mechanism according to one embodiment of the present invention.

Referring to FIG. 4, in some implementations, the conveying mechanism further includes a driving motor 150 arranged on the front side of the mounting portion 200, and the front side and the rear side of the conveying platform are equipped with a driving wheel respectively. More specific, the driving motor 150 may be arranged on above the conveying platform or at the bottom of the conveying platform, and in this implementation, it takes the driving motor 150 arranged on above the conveying platform for example. The driving motor 150 drives the rear driving wheel to rotate via a conveying assembly, and the rear driving wheel drives the front driving wheel 160 to rotate via a conveyor belt which is sleeved both on the front driving wheel 160 and the rear driving wheel. In addition, the driving motor 150 may be an internal rotor motor or an external rotor motor. When the driving motor 150 is an external rotor motor, the driving motor 150 is disposed between the fixed baffle 140 and the mounting portion 200, which can avoid the situation that the driving motor150 will collide with the package to effect function of the driving motor 150.

In some implementations, The front and rear sides of the conveying platform are respectively provided with a detection device 190 to detect the position of packages on the conveying platform, which can control the conveyor belt to perform working. More specific, detection devices 190 are arranged on the front and the rear of the two side baffle plates 120, and the detection device 190 includes an optical sensor, and a pair of the optical sensors is arranged on the front of the two side baffle plates 120, that is, one optical sensor arranged on one side baffle plate 120 is configured to transmit a signal and the other optical sensor arranged on the other side baffle plate 120 respectively is configured to receive the signal. In addition, the detection device 190 further includes an amplifier sensor assembly 191 which is coupled to the pair of the optical fiber sensors to transfer data from the optical sensor to a controller. In some implementations, the amplifier sensor assembly 191 may be arranged on the back of the fixed baffle 140.

In some implementations, two sides of the movable baffle 130 are respectively provided with cylinders 180, and the movable baffle 130 is fixedly connected to the piston 181 of the cylinder. More specific, one end of the movable baffle 130 fixedly connected to the piston 181 of the cylinder, and the movable baffle 130 can slide up and down along with the piston 181 sliding up and down in the cylinder 180, which may prevent the package from falling down form the conveying platform.

In some implementations, in addition, two sliding rails 131 are respectively disposed on the two sides of the movable baffle 130, to which the movable baffle 130 is slidably coupled. The sliding rail 131 defines both the sliding space of the movable baffle 130 and the sliding height of the movable baffle 130. Moreover, the sliding height of sliding rail 131 is equal to the height of the baffle plate 120.

Practically, the movable baffle 130 may includes a sliding block, which is slidably coupled into the sliding rails 131 so as to drive the movable baffle 130 to move. In addition, a driving assembly is connected with one end of the movable baffle 130 to drive the movable baffle 130 move. The driving assembly may be a hydraulic cylinder or a pneumatic cylinder.

In some implementations, the mounting portion 200 may include a mounting hole corresponding to the shape of the end of the robot arm, and a plurality of fixing holes distributed around the mounting hole, with which can facilitate the end effector installing on the robot arm and facilitate the end effector detaching form the robot arm. After the fixing holes of the mounting portion 200 is corresponding to the fixing holes of the robot arm, a screw bolt is fixed in the mounting hole so that the end effector is connected with the robot arm.

Figure 5:
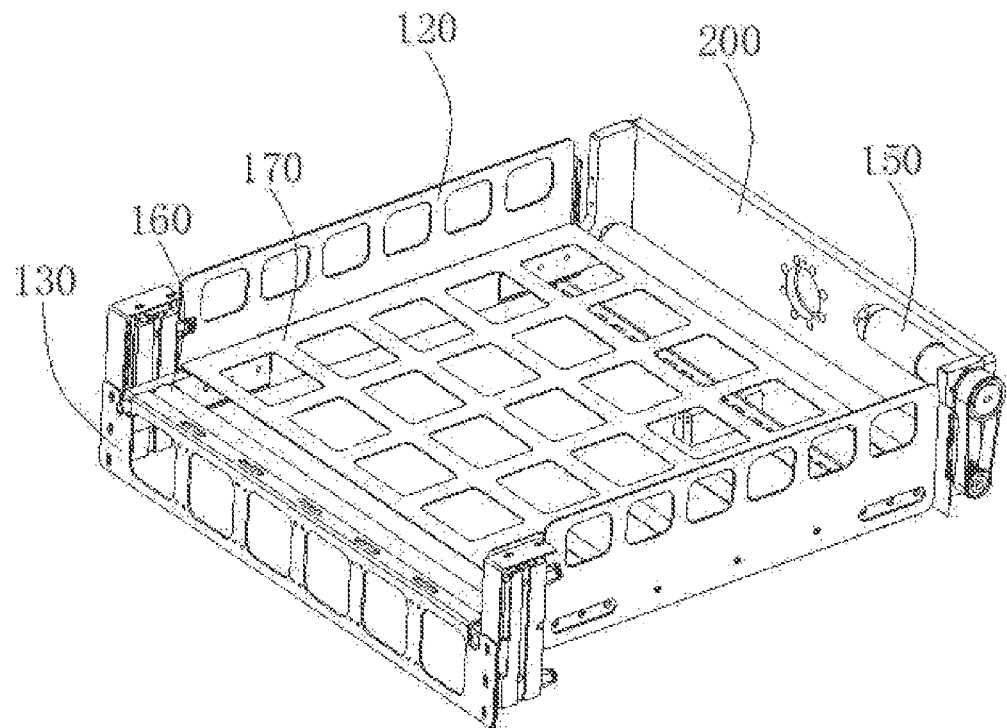
FIG. 5 a schematic three-dimensional view of the conveying mechanism according to one embodiment of the present invention before assembling the support mechanism into the conveying platform.

Referring to FIG. 5, in some implementations, a support mechanism 170 may be arranged below the conveying platform. More specific, the support mechanism 170 can be configured as a bearing plate of a hollow structure, and the bearing plate is disposed between the front driving wheel 160 and the rear driving wheel. Moreover, the bearing plate is much closer to the top conveyor belt of the conveying platform than the bottom conveyor belt of the conveying platform, resulting that the bearing plate can support the top conveyor belt of the conveying platform and meanwhile the hollow structure of the bearing plate can reduce the weight of the end effector.

When the end effector is ready for receiving the package, the front end of the end effector is arranged downstream of the external conveying mechanism in a transport direction for taking-over the package from the external conveying mechanism, resulting in the front end of the conveying platform adjacent to the exit of the external conveying mechanism, and the upper surface of the conveying platform is slightly lower than that of the external conveying mechanism. When the package is conveyed form the external conveying mechanism, the movable baffle 130 slides down, that is, the exit of the end effector is open; and the driving motor 150 arranged on the front side of the mounting portion 200 drives the conveyor belt of the conveying platform to run so as the end effector to attract the package into the upper surface of the end effector from the external conveying mechanism, and meanwhile when the detection device 190 detects a signal that a package passes through the pair of optical sensors, the amplifier sensor assembly 191 transfers the signal to the controller so as to control the movable baffle 130 to slide up to close the exit of the end effector. After that, the robot arm delivers the package to a destination, such as on a sorting line or in storage container.

Figure 6:
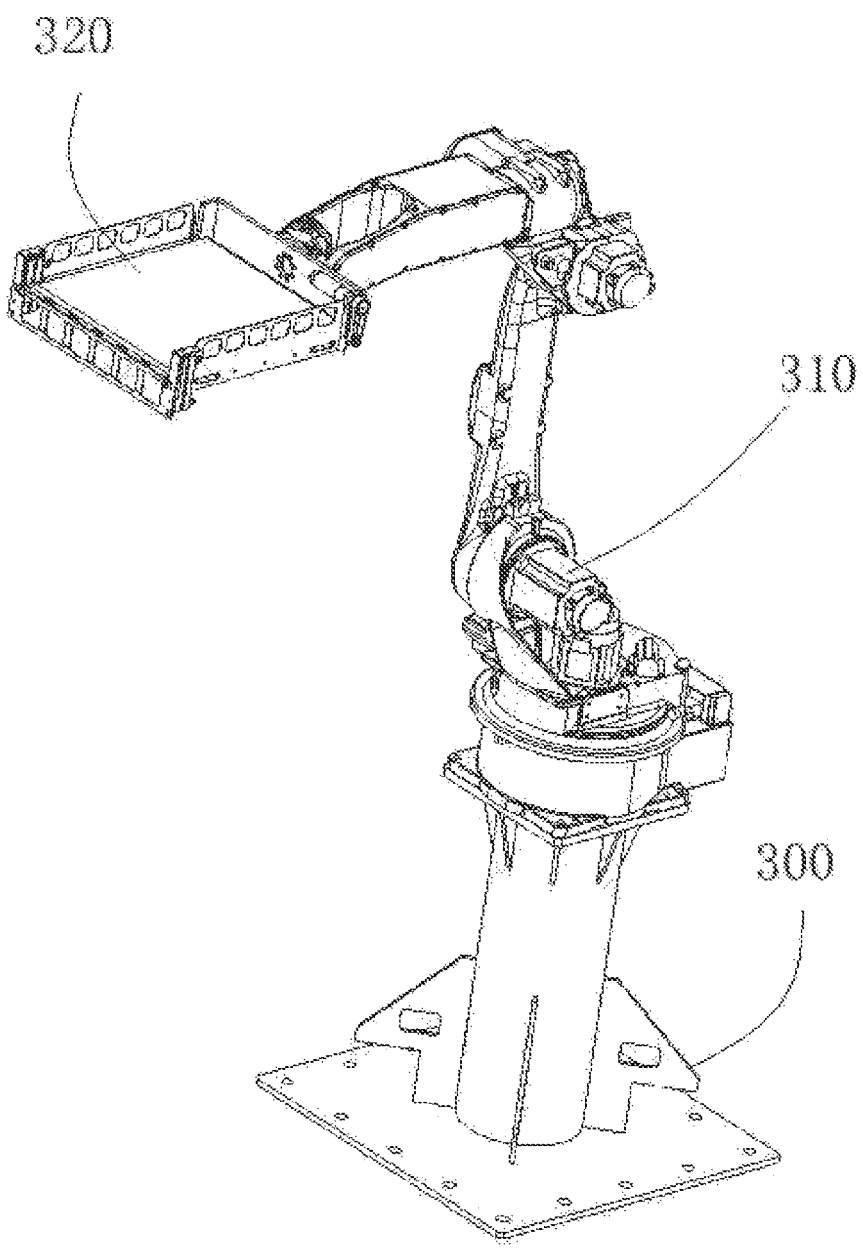
FIG. 6 is a schematic three-dimensional view of the robot according to one embodiment of the present invention.

Referring to FIG. 6, based on the above embodiments, the FIG. 6 shows a robot that controls a motion trajectory of the end effector. The robot includes: a base 300, a robot arm assembly 310, and the end effector 320.

The base 300 is configured to support and fix the robot; and the end effector 320 of this embodiment can be set by referring to the structure and the connection described in the embodiments above, and they will not be described again; and moreover, the robot arm assembly 310 is configured to move the end effector 320.

Referring to FIG. 7, based on the above embodiments, the FIG. 6 shows a package sorting system for sorting and transporting the packages. The package sorting system includes: a package delivery platform 400 for transporting the packages; a package sorting device 410 being configured as the robot described in the embodiments above and it will not be described again; and a package storage device 420 for storing the package that is already sorted by the package sorting device 410.

When working, the package delivery platform 400 delivers the packages to the package sorting device 410 and the robot moves the end effector 320 to the package storage device 420 corresponding the sorted package. In addition, when the end effector 320 reaches in the front of the package storage device 420, the end effector 320 can exert a force to the package by the conveyor belt of conveying platform so that the package flows into the corresponding package storage device 420.

When the end effector 320 is configured to the conveying platform, the package flows into the conveying platform from the package delivery platform 400. After the package falls into the front end of the conveying platform, the conveying platform can be activated to transport the package to the rear end of the conveying platform. Moreover, with the help of the movable baffle 130, after the package falls into the conveying platform, controlling the movable baffle 130 to slide up to close the exit of the end effector 320; and after the end effector 320 reaches in the front of the package storage device 420, controlling the movable baffle 130 to slide down to open the end effector 320 and the conveying platform delivers the package to the corresponding package storage device 420 by activating the conveyor belt to run.

The invention is described with reference to the accompanying drawings and the specifications. These and/or other aspects and advantages of the invention will become apparent and more readily appreciated from the following description of the embodiments, taken in conjunction with the accompanying drawings. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An end effector, comprising a mounting portion and an execution portion, wherein the execution portion includes:
   at least a package placement platform configured to be movably coupled to the mounting portion, and the package placement platform includes a fixed baffle arranged at the rear end of the package placement platform;
   wherein the package placement platform is configured as a conveying platform, which is movably coupled to the mounting portion by a conveying mechanism;
   wherein the conveying mechanism includes a driving motor, and the driving motor is disposed between the fixed baffle and the mounting portion.

2. The end effector as defined in claim 1, wherein the package placement platform is configured to be a horizontally arranged plate-like structure.

3. The end effector as defined in claim 2, wherein a baffle plate is arranged on at least one side of the package placement platform.

4. The end effector as defined in claim 3, wherein part or all of the baffle plate is configured to be a hollow structure.

5. The end effector as defined in claim 1, wherein a movable baffle is arranged on the front side of the conveying platform.

6. The end effector as defined in claim 5, wherein two sides of the movable baffle are respectively provided with cylinders, and the movable baffle is fixedly connected to a piston of the cylinder.

7. The end effector as defined in claim 5, wherein two sliding rails are respectively disposed on the two sides of the movable baffle, to which the movable baffle is slidably coupled.

8. The end effector as defined in claim 1, wherein the front and rear sides of the conveying platform are respectively provided with a detection device to detect the position of packages on the conveying platform.

9. The end effector as claimed in claim 1, wherein a support mechanism is further disposed underneath a conveying platform.

10. A robot, comprising: a base, a robot arm assembly, and an end effector arranged on the rear end of the robot arm assembly, and the end effector comprising a mounting portion and an execution portion, and the execution portion including at least a package placement platform configured to be movably coupled to the mounting portion, and the package placement platform includes a fixed baffle arranged at the rear end of the package placement platform;

wherein the package placement platform is configured as a conveying platform, which is movably coupled to the mounting portion by a conveying mechanism;

wherein the conveying mechanism includes a driving motor, and the driving motor is disposed between the fixed baffle and the mounting portion.

11. The robot as defined in claim 10, the package placement platform is configured to be a horizontally arranged plate-like structure, and a baffle plate is arranged on at least one side of the package placement platform.

12. The robot as defined in claim 10, wherein a movable baffle is arranged on the front side of the conveying platform.

13. The robot as defined in claim 12, wherein two sides of the movable baffle are respectively provided with cylinders, and the movable baffle is fixedly connected to a piston of the cylinder.

14. The robot as defined in claim 13, wherein two sliding rails are respectively disposed on the two sides of the movable baffle, to which the movable baffle is slidably coupled.

15. The robot as defined in claim 10, wherein the front and rear sides of the conveying platform are respectively provided with a detection device to detect the position of packages on the conveying platform.

16. A package sorting system, comprising: a package delivery platform, a package sorting device and a package storage device, wherein the package sorting device is configured as the robot as claimed in claim 10.

* * * * *